United States Patent [19]

Kajikawa et al.

[11] Patent Number: 5,031,680
[45] Date of Patent: Jul. 16, 1991

[54] PNEUMATIC RADIAL TIRE TREAD WITH RECTANGULAR BLOCKS HAVING SIDE GROOVES

[75] Inventors: Akira Kajikawa; Saneto Saito; Kenji Saito, all of Kobe, Japan

[73] Assignee: Sumitomo Rubber Industries, Ltd., Hyogo, Japan

[21] Appl. No.: 385,146

[22] Filed: Jul. 26, 1989

[30] Foreign Application Priority Data

Aug. 12, 1988 [JP] Japan .................. 63-202479

[51] Int. Cl.$^5$ .................. B60C 11/11; B60C 11/14
[52] U.S. Cl. .................. 152/209 R; 152/210
[58] Field of Search .............. 152/209 R, 209 D, 210, 152/211, 212; D12/140, 148

[56] References Cited

U.S. PATENT DOCUMENTS

| | | | |
|---|---|---|---|
| 2,670,777 | 3/1954 | Wallace | 152/209 R |
| 4,676,290 | 6/1987 | Tansei et al. | 152/209 R |
| 4,702,292 | 10/1987 | Brayer | 152/209 R |
| 4,856,571 | 8/1989 | Collette et al. | 152/209 R |

FOREIGN PATENT DOCUMENTS 2326455 11/1974 Fed. Rep. of Germany .
79499 6/1979 Luxembourg .

OTHER PUBLICATIONS

Gummibereifung vol. 59, No. 4, Apr. 1983, pp. 14–15, Bielefeld, DE; Avon Turbospeed, Fulda Y-2000.
Gummibereifung vol. 64, No. 4, Apr. 1988, p. 50, Bielefeld, DE; Semperit Direction.

Primary Examiner—Caleb Weston
Assistant Examiner—Geoffrey L. Knable
Attorney, Agent, or Firm—Birch, Stewart, Kolasch & Birch

[57] ABSTRACT

A pneumatic tire having tread blocks provided in the side walls with grooves opened at the top of the block, the depth gW of each groove in the axial direction of the tire being in the range of 5 to 50% of the block width BW, the width gL of each groove in the circumferential direction being in the range of 5 to 25% of the block length BL, the height gH of each groove at the block side wall being in the range of 15 to 80% of the depth GH of a main groove dividing the block, whereby performances on the snowy and icy roads and noise generation and wear resistance on the normal roads are well improved in good balance.

10 Claims, 7 Drawing Sheets

PNEUMATIC RADIAL TIRE TREAD WITH RECTANGULAR BLOCKS HAVING SIDE GROOVES

BACKGROUND OF THE INVENTION

The present invention relates to a pneumatic tire having tread blocks provided in the side wall with grooves, whereby performances on the snowy and icy roads and noise generation and wear resistance on normal roads are well improved in good balance.

According to the recent intensification in regulations for using spiked tires, the use of studless tires has been increased. Although the studless tires have no spikes, they have superior performances on the snowy and icy roads to the normal tires due to improvements in properties of the tread rubber at low temperature.

On the other hand, as the studless tires have more opportunity to be used on normal roads as well as on snowy and icy roads, it is necessary for the studless tires to upgrade the traveling properties by improving both the noise generating property and wear resistance, as well as its performance on snowy and icy roads.

Concerning these tire performances, it is known that:

(a) block type tread patterns can enhance performances on snowy and icy roads but are inferior in low noise performance;

(b) in the block type tread patterns, an increase in the ratio of the grooved area to the total area of the ground contacting face improves performance on snowy roads, but reduces the performance on icy or icebound roads;

(c) in the block type tread patterns, an increase in the number of sipes provided on the block improves the performances on snowy and icy roads, but heightens the noise level and accordingly lowers the low noise performance;

(d) on the other hand, rib type tread patterns are superior in low noise performance, but are inferior in their performance on snowy and icy roads; and (e) in the rib type tread patterns, by reducing the number of sipes formed on the rib, the low noise performance is improved, but the performances on snowy and icy roads are reduced.

Thus, the performances on snowy and icy roads and the low noise performance and wear resistance on normal roads could not be satisfied simultaneously, and the performances on snowy and icy roads should be considered as different performances.

It is therefore, an object of the present invention to provide a pneumatic tire, in which the performances on snowy and icy roads and the low noise performance and wear resistance on normal roads are improved in good balance.

SUMMARY OF THE INVENTION

According to one aspect of the present invention, a pneumatic tire comprises a tread provided with main grooves extending in the circumferential direction of the tire and lateral grooves connecting the main grooves to form multiple blocks having two side walls facing the main grooves and two end walls facing the lateral grooves, each of the blocks being provided in the side walls with at least two side grooves, the depth gW of each of the at least two side grooves in the axial direction of the tire being not less than 5% and not more than 50% of the block width BW defined as the distance between the side walls of the block, the width gL of each of the at least two side grooves in the circumferential direction being not less than 5% and not more than 25% of the block length BL defined as the length between the end walls of the block, and the height gH of each of the at least two side groove at the side wall being not less than 15% and not more than 80% of the groove depth GH of the main groove.

According to another aspect of the present invention, the pneumatic tire comprises a tread made of a rubber composition including powdery processed husks of grain, such as rice.

BRIEF DESCRIPTION OF THE DRAWINGS

Embodiments of the present invention will now be described in detail with refference to the drawings, wherein.

DETAILED DESCRIPTION OF THE INVENTION

Figure 1:
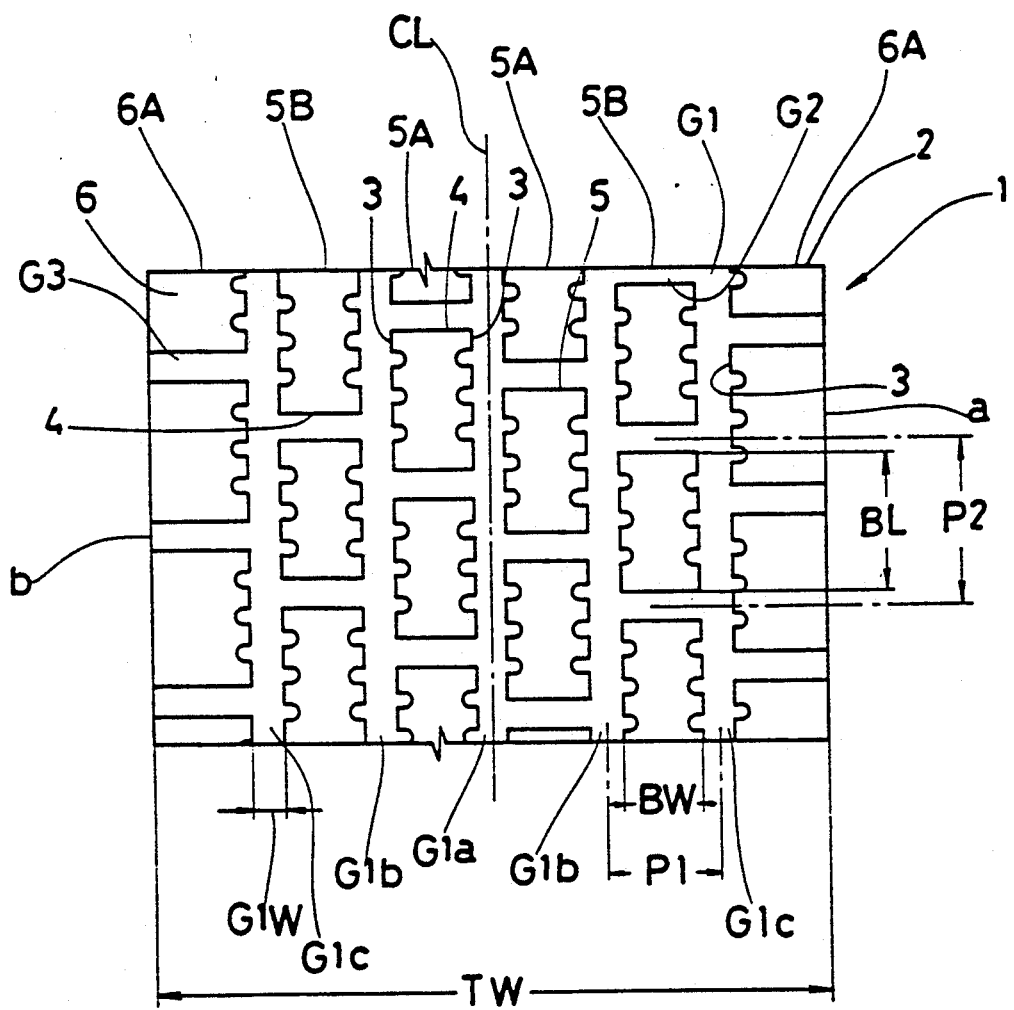
FIG. 1 is a developed view showing the tread pattern of an embodiment of the present invention.

In FIG. 1, a pneumatic tire 1 has a tread 2 provided with a main groove G1a extending along the equator CL of the tire and two main grooves G1b, G1c disposed on each side of the main groove G1a. All the main grooves G1 are straight grooves.

The ribs each formed between the adjacent two main grooves G1 are divided by lateral grooves G2 connecting therebetween into four rows 5A, 5B of blocks 5 having side walls 3 each facing a main groove G1 and end walls 4 each facing a lateral groove G2. Further, the ribs formed between the outermost main grooves G1c and the tread edges a and b are divided into two rows 6A and 6A of blocks 6 along the edges a and b by lateral grooves G3 thereon.

Since the main grooves G1 are straight in the circumferential direction of the tire and the lateral grooves G2 and G3 are also straight in the axial direction of the tire, the shape of the blocks 5 and 6 is a rectangle in any plane.

Moreover, in this embodiment, the main grooves G1a, G1b and G1c are arranged at regular intervals P1 in the axial direction of the tire, and also the lateral grooves G2 are arranged at regular intervals P2 in the circumferential direction. Accordingly, the blocks 5 have an identical rectangular shape in plane.

Here, the distance between the main groove G1c and the edge a, b is longer than the interval P1 of the main grooves G1, that is, the blocks 6 along the tread edges a and b are formed wider than the blocks 5.

The phases of the lateral grooves G2, G3 are shifted step for step in the circumferential direction of the tire from one tread edge a to the other tread edge b in order.

In this way, the tire 1 has a block type tread pattern.

The ratio SG/S of the total area SG of the grooves G1, G2 and G3 at the surface of the tread 2 or the grooved area to the total area S of the surface of the tread 2 is preferably set to be not less than 0.2 and not more than 0.55. When the ratio SG/S is less than 0.2, though the wear resistance is enhanced, the grip force with the snow and ice is reduced, thereby lessening the performances on the snowy and icy roads. Accordingly, it is more preferable to set the ratio not less than 0.3. To the contrary, when it is over 0.55, the grooved area becomes so large as to decrease the wear resistance. Accordingly, the ratio SG/S should be more preferably set not more than 0.5.

For that reason, in this embodiment having five main grooves, the total of the groove widths G1W of the main grooves G1 is set in a range from 0.2 to 0.35 times the tread width TW between the edges a and b. Even when the number of main grooves is changed, the total width thereof is preferably set in substantially same range as above. The groove widths G1W of the main grooves G1 can be set either identical or different. This makes it easy to keep the ratio SG/S in the above range, and enhance the straightforward traveling property and draining performance of the straight main grooves G1.

The widths of the lateral grooves G2 and G3 are set in a range not more than the groove width G1W of the main groove G1 and not less than 0.6 times thereof. This makes it possible to maintain the traction performance by the lateral grooves G2 and G3.

The intervals P2 of the lateral grooves G2, G3 in the circumferential direction are designed to divide the entire circumference of the tire into not less than 45 parts and not more than 75 parts, more preferably not less than 50 parts and not more than 65 parts. When this number of the intervals or that of the blocks in each row 5A, 5B, 6A exceeds 75, the block length GL between the end walls 4, becomes so short that the stiffness of the block in the circumferential direction is reduced, and the wear resistance is sacrificed, and further the low noise performance is lessened. On the other hand, when the number is less than 45, the block length BL is so long as to reduce the number of lateral grooves G2 and G3, which worsens the engaging force with the snow surface and aggravates the performances on the snowy and icy loads. Consequently, the intervals P2 should be set so as to form 45 to 75 blocks and more preferably 50 to 65 blocks in the circumferential direction.

In the meantime, it is possible to change the intervals P2 according to the pitch variation method.

Figure 2:
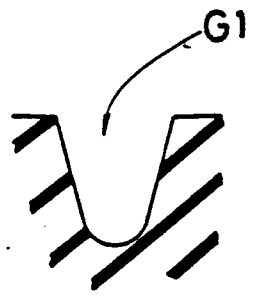
FIGS. 2 to 4 are sectional views showing examples of the main grooves.
Figure 3:
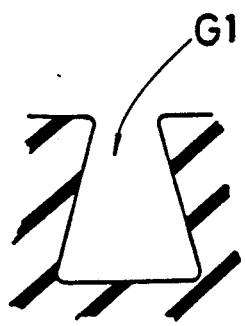
Figure 4:
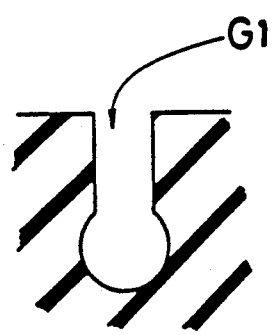

For the main groove G1, as shown in FIGS. 2 to 4, a variety of shapes, such as, a U-shape, one widened toward the bottom, one having a wider almost circular part in the bottom, can be used. By increasing the width in the bottom part as shown in FIGS. 3 and 4, the side walls of the blocks 5 and 6 can be easily deformed, and the fitting property with the snow and ice can be improved.

The blocks 5 are provided in each of the side walls thereof with at least two, in this embodiment, three side grooves 7 at regular intervals. The number of the side grooves 7 can be changed appropriately from one to six a block. Likewise, the block 6 is also provided on one of the side walls 3 facing the main groove G1c with the side grooves 7.

Figure 5:
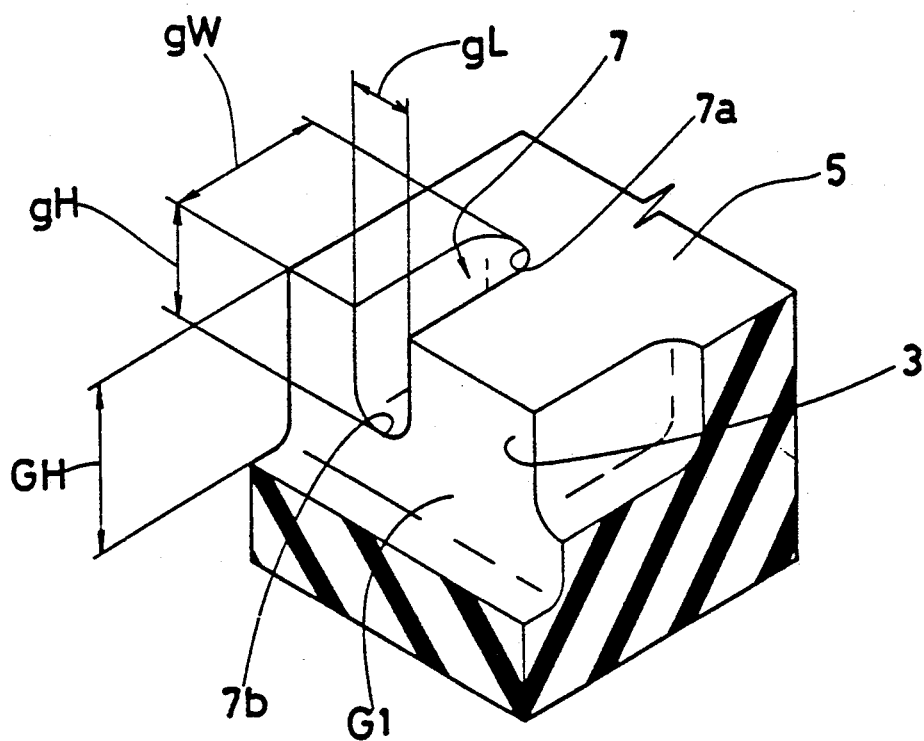
FIGS. 5 to 10 are sectional views showing examples of side grooves.

The side groove 7 extends in a radial direction of the tire, and the radially outer end must be opened at the top of the block to increase the edges of the block. In this embodiment, the groove 7 is of a U-shape and has a curved inner wall 7a and a curved bottom 7b as shown in FIG. 5.

The depth gW of the side groove 7 from the block side wall 3 to the inner wall 7a is set not less than 5% and not more than 50% of the block width BW which is the distance between the side walls 3 of the block 5.

The width gL of the side groove which is the width of the side groove in the circumferential direction of the tire at the block side wall is set not less than 5% and not more than 25% of the block length BL which is the distance between the end walls 4 of the block 5.

The height gH of the side groove at the block side wall 3 is set not less than 15% and not more than 80% of the depth GH of the main groove G1.

The side grooves 7 enhance the snow scraping effect of the block and improves the starting, accelerating and braking performances on the snow in comparison with the blocks having no side groove, thereby upraising the traction on the snow and driving ability on the snow. Also on the ice surface, the edge between the side groove face and the tread face enhances the ice shaving effect and the engaging effect with the ice exerted, and the starting, accelerating and braking performances are improved. As a result, traction and driving performances on the ice are improved.

When the depth gW is shorter than 5% of the block width BW, the scraping effect on the snow and the engaging effect with the ice by the edge are inferior. To the contrary, when the depth gW is longer than 50%, pattern noise is generated, and the side grooves 7 tends to cause a heel and toe wear of the block.

When the width gL is less than 5% of the block length BL, the groove width is too short, which aggravates the scraping effect and engaging effect on the snow, and reduces the performance on the snow. Or when it is larger than 25%, the grooved area is excessively large and the ground contact area becomes small, and the wear resistance is sacrificed.

Moreover, when the height gH is less than 15% of the groove depth GH of the main groove, the side grooves 7 are eliminated relatively early in the tire life due to the abrasion of the tread, which brings about a decrease in the scraping effect on the snow and ice. When it is larger than 80%, the stiffness of the block 5 is lowered, and the low noise performance and wear resistance are likely to be reduced.

Figure 6:
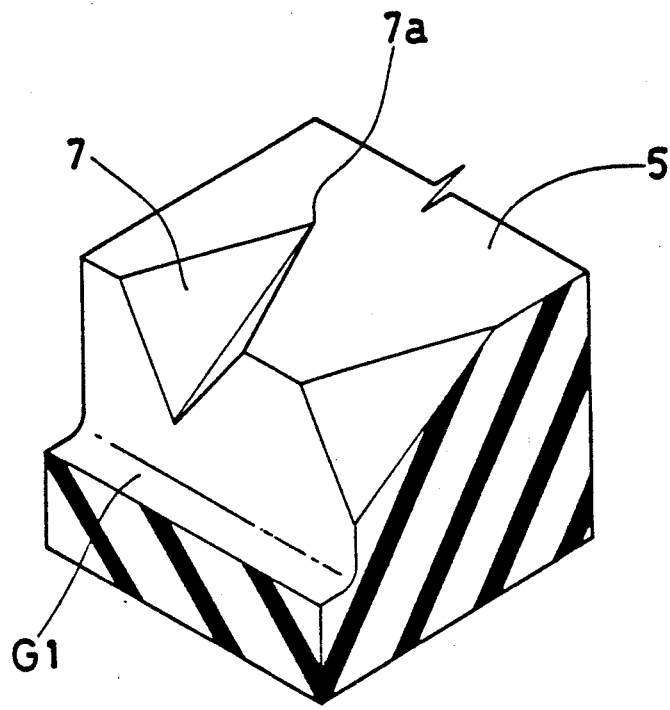
Figure 8:
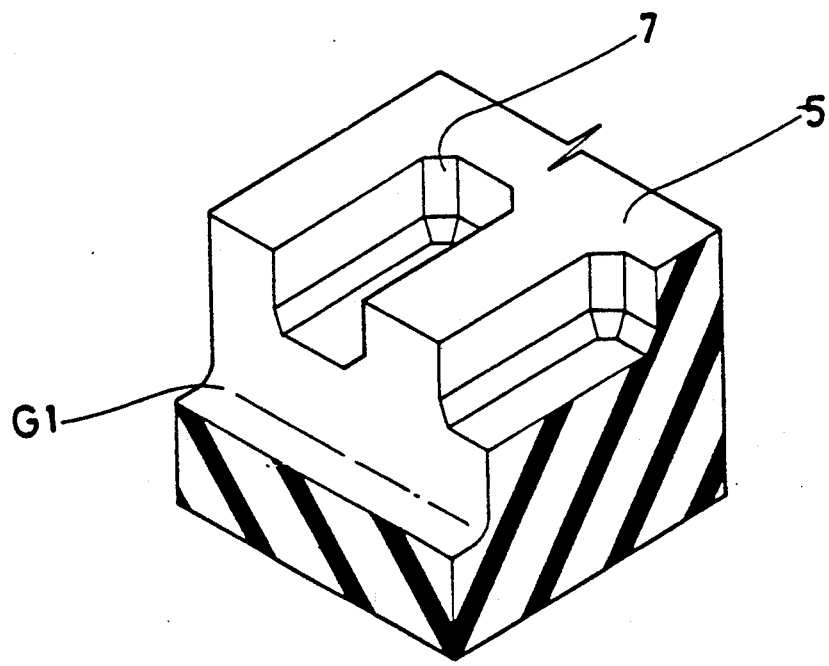
Figure 7:
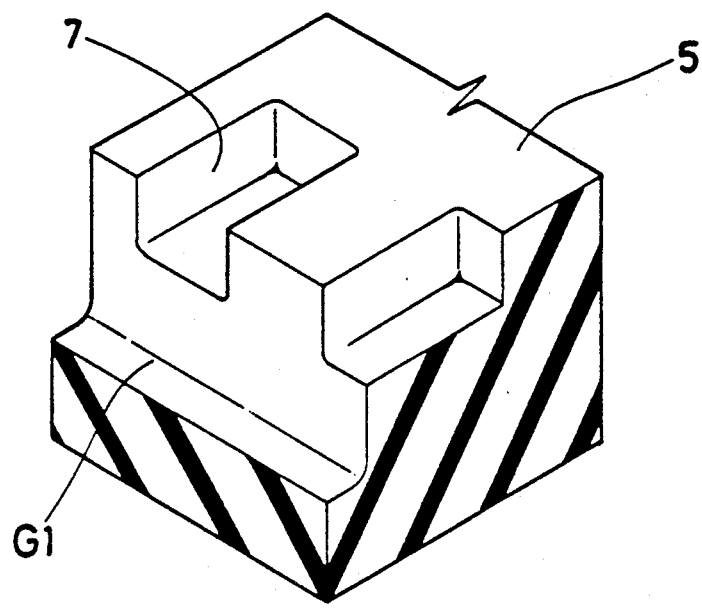
Figure 9:
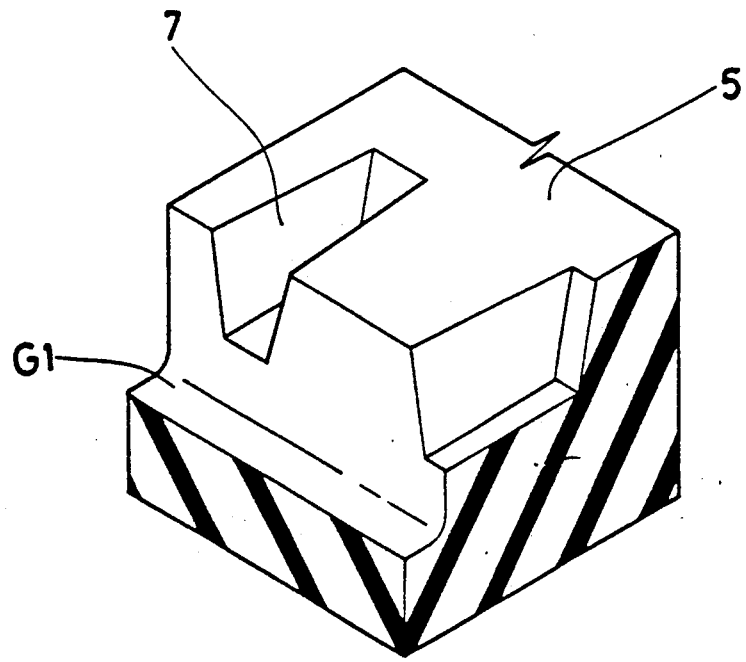
Figure 10:
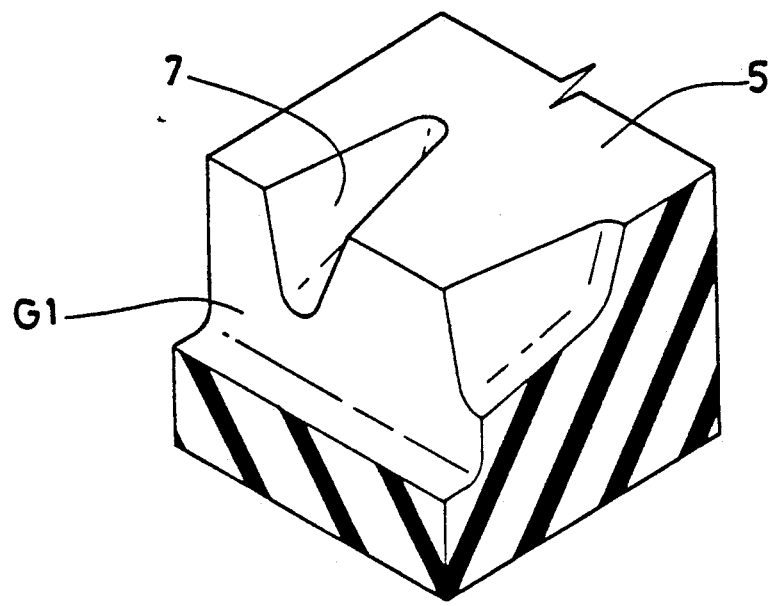

For the side grooves 7, a variety of forms can be used instead of the above-mentioned U-shaped one shown in FIG. 5 such as, for example:

(1) V-shaped grooves reducing its radial depth toward the inner wall 7a as shown in FIG. 6;

(2) grooves having a rectangular section as shown in FIG. 7;

(3) grooves having inclined walls around the bottom as shown in FIG. 8;

(4) trapezoid grooves gradually reduced in the width gL toward the inner end 7a and having groove walls inclined as shown in FIG. 9; and (5) rounded-V-shaped grooves gradually reduced in width toward the inner wall 7a wherein the inner wall and bottom are rounded as shown in FIG. 10.

On the other hand, it is known that a great number of sips formed on the blocks to reduce the stiffness of the blocks and to raise the edge effect can increase the performance on snow and ice, but they increase pattern noise in particular in a high frequency band, and further reduce the resistance to wear.

To the contrary, by using the side grooves in the above structure, the performances on snow and ice can be improved without increasing noise and sacrificing the wear resistance so much.

Figure 11:
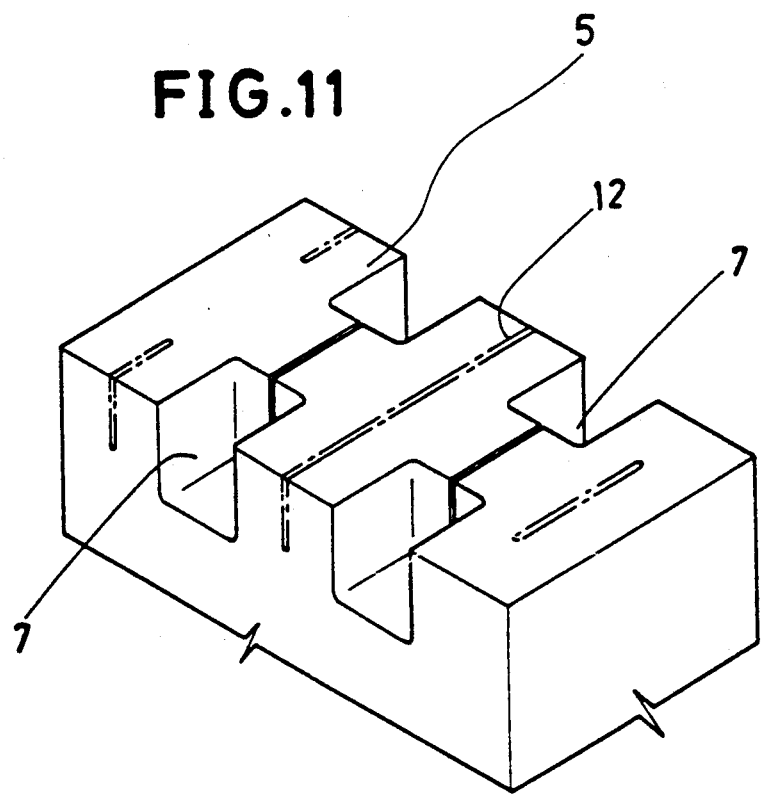
FIG. 11 is a perspective view showing a block.

It is however possible to provide an axially extending sip 12 on the block together with the side grooves as shown in FIG. 11, and the number of the sip(s) is selected from one to five.

If it is intended to improve the performances on snow and ice by sipes alone, the sipes worsen the low noise performance and wear resistance. However, the combination use of the sipes with the grooves 7 can lessen the sipes in the number and dimensions, and it is effective for enhancing the performances on snow and ice. Therefore, such tires are also included in the present invention.

As shown by a single-dot chain line, the sip 12 can be formed to cross over the block, and also they can be formed only in the center part between the side grooves 7 as shown by a solid line, and further it is possible to form them only near the side walls 3, or only at the center part of the block, or combining these patterns.

The sips 12 may be formed on all the blocks 5, 6 or on appropriate block rows, or in a block row, by skipping one or two blocks or the like.

In this way, it is possible to use the sip(s) 12 for the purpose of improving the performances on snow and ice while preventing a decrease in the low noise performance and wear resistance.

As the tread rubber of the tread 2, a rubber compound containing powdery processed husk of rice is used.

Accordingly, when braking, accelerating, and turning operations are made on the icebound road, the husk, which is harder than the base rubber, scratches the icebound road surface, that is, functions as a spike. When the husk drops out, holes are formed, and the edges thereof enhance the friction force with the iced surface, thereby improving the grip and traction and consequently the performance on the ice.

To obtain the above effects, the average particle size of the husk is set at 20 to 600 microns. When it is less than 20 microns, the spike effect is inferior. When it is more than 600 microns, the contact of the husk itself with the road surface is so increased that the contact of the rubber with the road surface is reduced, which may lessen the grip performance on the ice.

The husk content is set 3 to 25 parts by weight to 100 parts by weight of the rubber base. When it is less than 3 parts by weight, the spike effect is less. When it is more than 25 parts by weight, the contacting area of rubber with the ground is reduced and the wear resistance is reduced.

In addition, the husk does not cause damages to the road surface. Accordingly, the husk does not cause dust due to abrasion with the paved road, unlike rubber compounded with hard materials such as metals, and contact with the iced road surface can be maintained. Furthermore, since it is a natural product, environmental pollution can be prevented. Still furthermore, the husk is inexpensive, has an optimum hardness, fits well to the rubber, and does not cause a reduction of the tear strength of the tread rubber and crack resistance at the groove bottom.

On the other hand, the peak temperature at which the loss tangent (tan δ) of the tread rubber (measured by a viscoelastic spectrometer produced by Iwamoto Seisakusho) is a maximum is preferably not higher than $-40$ degs.C.

In the rubber compound in which the peak temperature is over $-40$ degs.C., the dependency of modulii (in particular, hardness) on the temperature is large, and the hardness tends to be increased in the low temperature range from $-40$ to $-10$ degs.C,. and as a result, the grip performance on ice is likely to be lowered.

For the same purpose, the Shore A hardness at $-20$ degs.C. is not less than 60 and not more than 70, and the Shore A hardness at 20 degs.C. is not less than 50 and not more than 60. It is thereby possible to improve the viscosity with the iced road surface and to upgrade the performance on snow and ice without sacrificing the wear resistance.

EXAMPLES

The following examples are exemplary of the present invention but should not be considered as limiting of the present invention.

Tires of size 165/80R13 were manufactured according to the specifications shown in TABLE 1, and the performance on snow, performance on ice, wear resistance, and the low noise performance thereof were measured.

In the test tires, the block arrangements in Examples 1, 2 and References 1 to 4 were identical to that shown in FIG. 1. The rectangular contour shape of the blocks were set identical to each other, and the ratio SG/S of the groove area to the entire area of the tread is set to 0.4.

In Example 1, the blocks were provided with side grooves in the same way as FIG. 1. In Example 2, the blocks were provided with V-shaped side grooves as shown in FIG. 6. In References 1 and 2, the blocks had no groove. In References 3 and 4, the blocks were provided with sips. The specifications of the side grooves and the sips, together with the figures of the blocks, are shown in TABLE 1.

(a) Performances on the snow and ice

The tires were mounted on four wheels of a 1500 cc passenger car.

Figure 12:
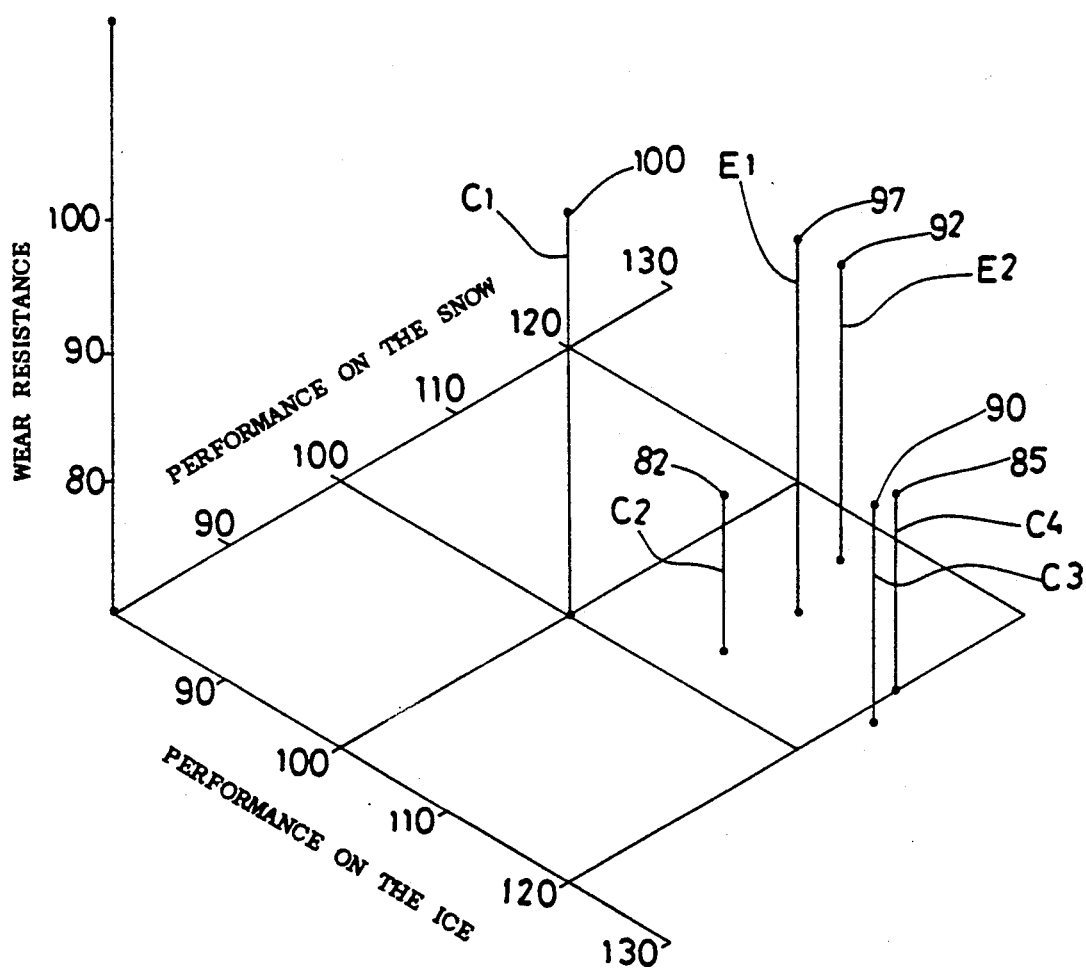
FIG. 12 is a diagram showing the results of tests for performances on the snow and ice and wear resistance.

Braking at the speed of 30 km/h, the running distance to stop was measured on an iced road to obtain the coefficient of friction between the road surface and the tread. The coefficients were normalized upon the assumption that Example 1 is 100, and they are shown in FIG. 12 as performance on the ice.

25 meter and 75 meter start dash tests were made on a snowy road. Regarding Reference 1 as 100, the average time on each tire was normalized and it is shown in FIG. 12 as performance on the snow.

In both the tests, the larger the index, the better the performance.

The tires of Examples 1 and 2 were superior in the performances on the snow to the tires of References 1, 2, 3 and 4. As for the performance on the ice, References 2 and 3 presented better results.

(b) Wear resistance

By actually driving the car furnished with the test tires on a dry road, the driving distance until the tread abrasion becomes 1 mm was measured. Based on the assumption that Reference 1 is 100, the distance was normalized, and it is shown ib FIG. 12 as wear resistance.

The tires of Examples 1 and 2 were superior in the wear resistance to the tires of References 2 to 4.

(c) Low noise performance of tire life by using a rubber compound containing husk of grain as the tread rubber.

TABLE 1

Figure 13:
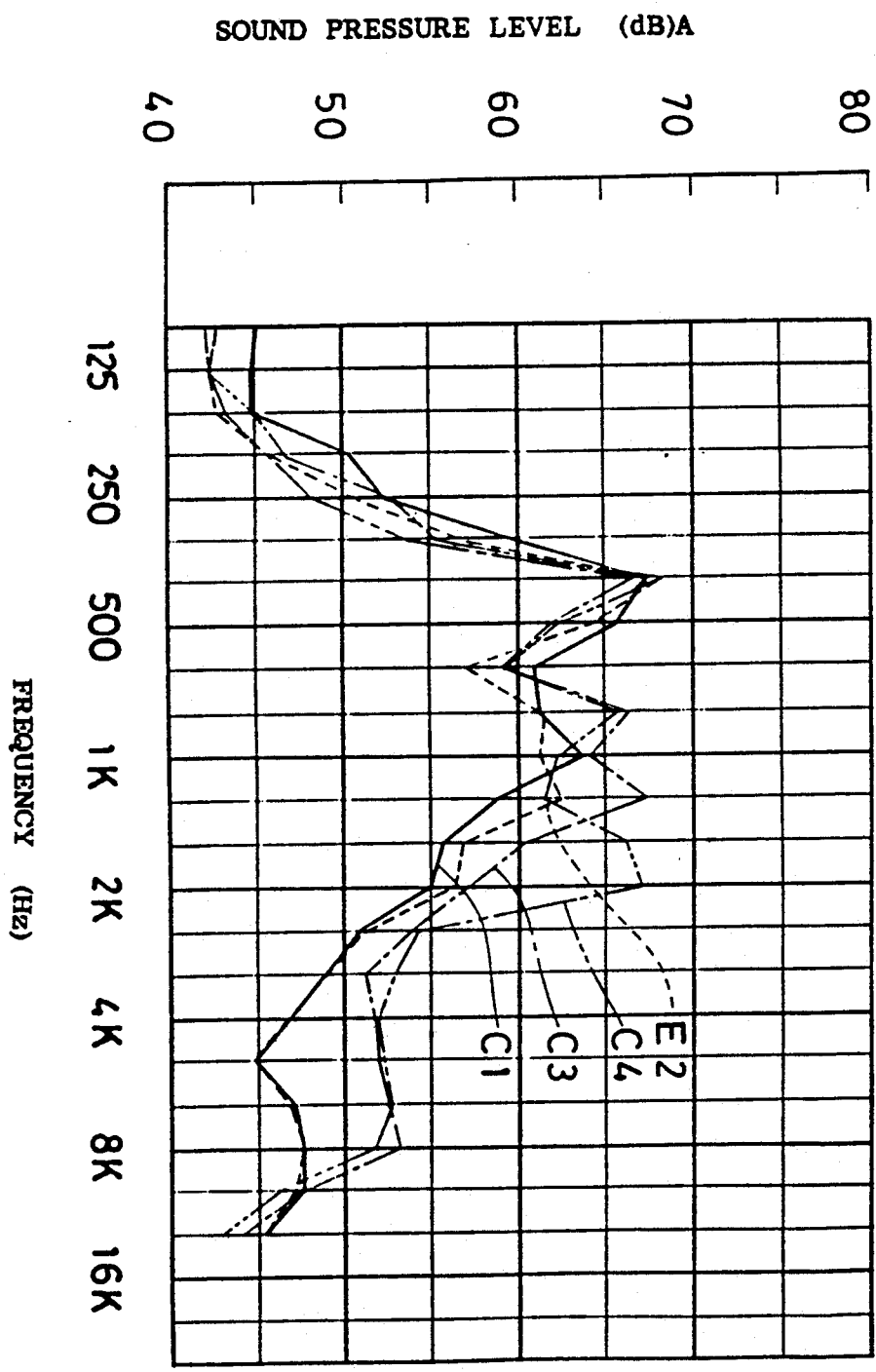
FIG. 13 is a diagram showing a frequency analysis of pattern noise.

|  | Ex. 1 | Ex. 2 | Ref. 1 | Ref. 2 | Ref. 3 | Ref. 4 |
|---|---|---|---|---|---|---|
| Symbol in FIGS. 12 & 13 | E1 | E2 | E1 | E1 | E1 | E1 |
| TREAD | | | | | | |
| Shore A hardness | | | | | | |
| at +20 degs. C. | 55 | 55 | 55 | 48 | 55 | 55 |
| at −20 degs. C. | 63 | 63 | 63 | 55 | 63 | 63 |
| TREAD GROOVE | | | | | | |
| Main groove width (mm) | 6.0 | 6.0 | 6.0 | 6.0 | 6.0 | 6.0 |
| Lateral groove width (mm) | 5.5 | 5.5 | 5.5 | 5.5 | 5.5 | 5.5 |
| BLOCK | | | | | | |
| Block length BL (mm) | 24.2 | 24.2 | 24.2 | 24.2 | 24.2 | 24.2 |
| Block width BW (mm) | 13.2 | 13.2 | 13.2 | 13.2 | 13.2 | 13.2 |
| Number of blocks | 63 | 63 | 63 | 63 | 63 | 63 |
| Side groove | FIG. 5 | FIG. 6 | None | None | None | None |
| gW/BW | 0.15 | 0.15 | | | | |
| gL/BL | 0.1 | 0.1 | | | | |
| gH/GH | 0.35 | 0.35 | | | | |
| Sip | None | None | None | None | | |
| Number | | | | | 2 | 2 |
| Depth (mm) | | | | | 7.0 | 7.0 |
| Block shape |  |  |  | 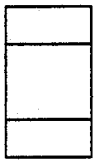 | 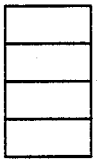 | 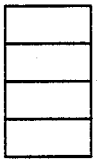 |

The tires of Example 1 and References 1, 3 and 4 were each mounted on a laboratory suspension and rotated on a drum at a speed of 40 km/h in an anechoic room, and according to JASO regulations noise at the position of 1.0 meter was analyzed of its frequency, and the results are shown in FIG. 13.

In the tests, the drum having a coarse particulate surface with a large coefficient of friction was used to remove the high frequency noise which does not appear in actual running.

In the tires of References 3 and 4, as shown in FIG. 13, the sound pressure level was high not only in a high frequency band but also in all over the band. To the contrary, the tire of Example 2 had little difference from Reference 1, and the sound pressure thereof was lower than those in References 3 and 4 in both a high frequency band and all over the band.

The improvement in the performances on the snow and ice by the side grooves prevents the increase in the pattern noise particularly in the high frequency area band in comparison with those of the sips, thereby preventing the low noise performance from decreasing. Further, a reduction in the stiffness of the block can be prevented when compared with the case of sips, and as a result, worsening of the wear resistance can be prevented.

In this way, it was clarified that the tires the embodiments were improved in the performances on the snow and ice, with the low noise performance and the wear resistance being in good balance.

As explained above, the tire of the present invention can improve the performances on both the snow and ice without sacrificing the low noise performance and wear resistance by arranging side grooves of a specific shape on the side walls of the block.

It is further possible to keep and raise the performances on snow and ice from the beginning to the end

We claim:
1. A pneumatic radial tire having a tread provided with at least two main grooves extending straight in the circumferential direction of the tire to axially divide the tread into at least three rib portions and lateral grooves extending across said at least three rib portions in substantially parallel with the axial direction of the tire to circumferentially divide each rib portion into a row of substantially rectangular blocks having two sides each facing the lateral groove and at least one side facing a main groove, each block provided on each side facing a main groove with at least two side grooves said side grooves having an outer end which open at said main groove, an inner end terminating within the block, a top end which is open at the top of the block, and a bottom end which terminates within the block, the side groove length gW measured axially from the outer end to the inner end being not less than 5% and not more than 50% of the axial width BW of the block, the side groove width gL measured circumferentially being not less than 5% and not more than 25% of the circumferential length BL of the block, the side groove depth gH measured radially from the top end to the bottom end being not less than 15% and not more than 80% of the depth GH of the main groove, and said lateral grooves being shifted circumferentially stepwise from one tread edge to the other tread edge.

2. The tire according to claim 1, wherein the ratio SG/S of the total SG of the areas of the main grooves at the tread face to the total area S of the tread face is not less than 0.2 and not more than 0.55.

3. The tire according to claim 1, wherein the number of the blocks in each row is in the range of 45 to 75.

4. The tire according to claim 1, wherein the lateral grooves in each rib portion are arranged at regular intervals.

5. The tire according to claim 1, wherein the lateral grooves in each rib portion are arranged at irregular intervals.

6. The tire according to claim 1, wherein the width of the main groove is increased toward the bottom.

7. The pneumatic radial tire according to claim 1 wherein said tread is made of a rubber composition containing powdery husk of grain.

8. The tire according to claim 7, wherein the average particle size of the husk is in the range of 20 to 600 microns, and the husk content is present in the amount of 3 to 25 parts by weight to 100 parts by weight of the rubber base.

9. The tire according to claim 1, wherein the peak temperature at which the loss tangent of the tread rubber is maximum is not larger than $-40°$ C.

10. The tire according to claim 1 or 9, wherein the Shore A hardness at $-20°$ C. of the tread rubber is not less than 60 and not more than 70, and the Shore A hardness at 20° C. of the tread rubber is not less than 50 and not more than 60.

* * * * *